United States Patent
Morchon et al.

(10) Patent No.: US 10,251,073 B2
(45) Date of Patent: Apr. 2, 2019

(54) METHOD FOR CONFIGURING A NODE DEVICE, A NETWORK AND A NODE DEVICE

(71) Applicant: PHILIPS LIGHTING HOLDING B.V., Eindhoven (NL)

(72) Inventors: Oscar Garcia Morchon, Eindhoven (NL); Sahil Sharma, Eindhoven (NL); Alfonso De La Vega Ruiz, Eindhoven (NL); David Perera Barreda, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 208 days.

(21) Appl. No.: 15/124,309

(22) PCT Filed: Mar. 5, 2015

(86) PCT No.: PCT/EP2015/054553
§ 371 (c)(1),
(2) Date: Sep. 7, 2016

(87) PCT Pub. No.: WO2015/135816
PCT Pub. Date: Sep. 17, 2015

(65) Prior Publication Data
US 2017/0019804 A1    Jan. 19, 2017

(30) Foreign Application Priority Data

Mar. 13, 2014  (EP) .................................. 14159347
May 26, 2014   (EP) .................................. 14169879
Jul. 10, 2014   (EP) .................................. 14176564

(51) Int. Cl.
| H04W 24/02 | (2009.01) |
| H04L 12/761 | (2013.01) |
| H04B 1/7136 | (2011.01) |
| H04L 12/18 | (2006.01) |
| H04W 40/02 | (2009.01) |
| H04W 40/32 | (2009.01) |

(52) U.S. Cl.
CPC .......... *H04W 24/02* (2013.01); *H04B 1/7136* (2013.01); *H04L 12/185* (2013.01);
(Continued)

(58) Field of Classification Search
CPC ..... H04W 24/02; H04W 40/02; H04W 40/32; H04B 1/7136; H04B 2201/71323;
(Continued)

(56) References Cited

U.S. PATENT DOCUMENTS

2007/0110063 A1   5/2007   Chunqiang et al.
2012/0230204 A1   9/2012   Vasseur et al.
(Continued)

FOREIGN PATENT DOCUMENTS

| JP | 2014120918 A | 6/2014 |
| RU | 2004117074 A | 5/2005 |
| WO | 2012140610 A1 | 10/2012 |

OTHER PUBLICATIONS

Gen Xu et al, "Multipath Routing Protocol for DAG-Based WSNs With Mobile Sinks", Proceedings of the 2nd International Conference on Computer Science and Electronics Engineering (ICCSEE 2013), pp. 1678-1682.

(Continued)

*Primary Examiner* — Melvin C Marcelo

(57) ABSTRACT

This invention relates to a device comprising a routing controller for routing messages to a plurality of node devices of a network, the routing controller comprising at least one global instance enabling the routing of messages to a routing set of node devices, at least one local instance for routing packets to a neighbor node device neighboring the device, wherein the neighbor node device is selected regardless whether the neighbor node device belongs to the routing set of node devices, and wherein the routing controller is (Continued)

configured to use the local instance for routing of multicast messages to the node devices.

21 Claims, 7 Drawing Sheets

(52) U.S. Cl.
CPC ...... *H04L 12/1845* (2013.01); *H04L 12/1877* (2013.01); *H04L 45/16* (2013.01); *H04B 2201/71323* (2013.01); *H04W 40/02* (2013.01); *H04W 40/32* (2013.01)

(58) Field of Classification Search
CPC ............... H04L 12/1845; H04L 12/185; H04L 12/1877; H04L 45/16
See application file for complete search history.

(56) References Cited

U.S. PATENT DOCUMENTS

| 2012/0254338 A1 | 10/2012 | Agarwal et al. |
| 2013/0028095 A1* | 1/2013 | Vasseur ................ H04L 45/38 370/241 |
| 2013/0227114 A1 | 8/2013 | Vasseur et al. |
| 2017/0255785 A1* | 9/2017 | Vidal Meca ............ H04W 4/70 |

OTHER PUBLICATIONS

T. Winter et al, RPL: IPv6 Routing Protocol for Low-Power and Lossy Networks; RFC6550, Internet Engineering Task Force, IETF; Standard Internet Society 4, Rue Des Falaises CH—1205 Geneva, Switzerland, Mar. 26, 2012, pp. 1-157, XP015081473.

Jonathan Hui et al, RPL: The IP Routing Protocol Design for Low Power and Lossy Networks; IEEE Draft; RPL, IEEE-SA, Piscataway, NJ USA, vol. MSC.UPAMD, Sep. 9, 2011, pp. 1-20, XP068029364.

Ako Shindo et al, Proposal and Evaluation of a Scheduling Mechanism for RPL-based Service Network Multiplexing, The Institute of Electronics, Information and Communication Engineers, JEICE Technical Report IN2013-3 (Apr. 2013) pp. 13-18.

Hiroshi Matsura, "Proposal of Multi-DODAG RPL Management System", Proceedings of the 2014 IECE General Conference, ISSN 1349-1369, Mar. 18-21, 2014, Niigata Univ., Niigata, pp. 1-5.

Pinney, T. et al "RPL Applicability in Industrial Networks Draft-IETF-Roll-RPL-Industrial-Applicability-02"; Internet Engineering Task Force, IETF, Standardworking, Internet Sociey (ISOC) 4, Rue Des Falaises CH—1205 Geneva, Switzerland, Oct. 21, 2013, pp. 1-31, XP015095666.

* cited by examiner

Communication in local instance that crosses boundary   Instance boundaries between global instances 1, 2, 3

Communication in local instance that crosses boundary   Instance boundaries between global instances 1, 2, 3

METHOD FOR CONFIGURING A NODE DEVICE, A NETWORK AND A NODE DEVICE

CROSS-REFERENCE TO PRIOR APPLICATIONS

This application is the U.S. National Phase application under 35 U.S.C. § 371 of International Application No. PCT/EP2015/054553, filed on Mar. 5, 2015, which claims the benefit of European Patent Application No. 14159347.5, filed on Mar. 13, 2014; European Patent Application No. 14169879.5, filed on May 26, 2014; and European Patent Application No. 14176564.4, filed on Jul. 10, 2014. These applications are hereby incorporated by reference herein.

FIELD OF THE INVENTION

The present invention relates to communication devices in a communication network, for example an outdoor lighting network where each node device is connected to a luminaire that is controlled by commands sent over the network. The invention is also relevant for methods for configuring such nodes.

This invention is, for example, relevant for outdoor lighting networks using wireless communication.

BACKGROUND OF THE INVENTION

In some communication networks, for example in outdoor lighting networks, each node device has two or more communication interfaces. In the example shown on FIG. 1, each node 100 of the network has a mesh interface 101 and a GPRS interface 102 for example. The GPRS interface 102 is used for performing the auto-commissioning with a backend, e.g., by means of UDP/DTLS/CoAP. In this sense, if the DTLS handshake is successful, the device can be registered and some configuration parameters can be sent to the device. Once all the node devices 100 have been commissioned, the mesh network can be configured and the networking parameters transmitted to a remote controller 110 over the GPRS connection. Furthermore, the GPRS module of some of the node devices 100 can be disabled so that those devices with a disabled GPRS talk to the backend only over the remaining devices that still have a GPRS interface enabled (e.g. node device 100a). Furthermore, this device 100a can act as a simple router further simplifying the overall communication architecture and ensuring end-to-end operation between the network and the remote controller 110 in the backend. This means that a part of the communication is done over the mesh network and another part over the GPRS network. The GPRS interface can also be another long range communication interface such as UMTS, LTE or even a long range sub-GHz radio with which the devices can communicate in a star topology in a long range.

In such a network, it is possible to have an all-IP system, thus minimizing the number of protocol translations. To this aim, 6LoWPAN is one of possible protocols that can be used. However, it is required to make sure that some basic communication patterns are still feasible, namely:

1. Unicast communication from the backend to any node device: this can be used for switching on/off a luminaire (Downlink Unicast).

2. Unicast communication from any node device in the lighting system to the backend: this can be used for energy reporting (Uplink Unicast).

3. Multicast communication from the backend to a set of devices in the lighting system: this can be used for a software update or for switching on/off a group of luminaires (Downlink Multicast).

4. Local communication in the lighting system between a number of node devices: this can be used to enable products requiring Peer to Peer communication. In such products, detectors and wireless communication are used to provide light on demand, i.e. when a moving person or vehicle is detected.

In a 6LoWPAN network, the routing protocol is specified by Routing Protocol for Low-power and lossy Networks (RPL). A RPL-based network is composed by RPL instances. Each of these RPL instances can have one or more Destination Oriented Directed Acyclic Graphs (DODAGs). Each DODAG ends in a special node called root.

Two types of instances can be found in the node devices:
Global instances, which are identified by an instance id. Each global instance can include multiple DODAGs (with a different root on each).
Local instances, which are special instances associated to a node. Each local instance can only have one DODAG. Two fields are needed to identify them: an instance id and a DODAG id. The DODAG id is a unique and reachable IP address of the node which acts as the root of the DODAG.

A node can only join one DODAG within an RPL instance, and communications between DODAGs of the same instance are not possible (they are isolated). On the other hand, a node can join different RPL instances at the same time. Thus, a node could own or be part of multiple local instances.

Moreover, there is a need in such network to support Multicast routing protocol. To achieve the above communication goals, it could be attempted to create multiple sub-networks each associated to a border router (with enabled GPRS), which is the root of the DODAGs of Global instance. However, this has the limitation that local communication is not possible when we look at the borders of the networks, as shown on FIG. 2. On this figure, it appears that subnetworks N1 and N2 are isolated and cannot communicate directly with this topology of the network. Communication between N1 and N2 can only be done via the backend, which in this case requires the use of GPRS transmission. Thus, communication from a node device from the subnetwork N1 to another node device from the subnetwork N2 is not efficient. Moreover, no multicast routing for nodes of both N1 and N2 is supported in this example.

SUMMARY OF THE INVENTION

It is an object of the invention to propose a device which alleviates the problems mentioned above.

It is another object of the invention to propose a method for configuring node devices in a network which allows an efficient routing protocol while proposing all the possible transmission modes.

In accordance with a first aspect of the invention, it is proposed a device comprising a routing controller for routing messages to a plurality of node devices of a network, the routing controller comprising
a global instance enabling the routing of messages to a routing set of node devices,
at least one local instance for routing packets to a neighbor node device neighboring the device, wherein the neighbor node device is selected regardless whether the neighbor node device belongs to the routing set of node devices, and wherein the routing controller is configured to use the local instance for routing of multicast messages to the node devices.

Thus, the local instance can be used to reach neighboring nodes that are not reachable with the global instance and that are part of another subnetwork. Then, the nodes of this other subnetwork can use their own global instance to route messages to nodes of their subnetwork. By routing the multicast messages with the local instance, this enables to avoid to route messages more efficiently.

In a first embodiment of the first aspect of the invention, the global instance comprises at least one destination oriented directed acyclic graph defining the routes, linking the node devices of the routing set and having as a root a node device being a router device bridging the network to a backend. This first embodiment enables, for example, to avoid to route messages through the backend and directly to a neighboring subnetwork through one of the routes proposed by the local instances. This is particularly interesting for applications requiring local communication or for multicast of messages.

In another embodiment of the first aspect of the invention, the routing controller is configured to use the global instance for unicast messages and for multicast messages from the backend. Thus, depending on the application or the target nodes of the message and their respective position in the network, the global instance can be used instead of the local instance for routing messages, offering more flexibility in the routing of messages.

In still another embodiment of the first aspect of the invention, communication between the backend and the network is carried out over a transmission medium which is different from the transmission medium of the network. This can be a long range communication medium, like GPRS or LTE.

In accordance with a second aspect of the invention, it is proposed a method for configuring a node device in a network, said node device comprising a routing controller for routing messages to other node devices of a network, the method comprising the steps of (a) creating in the routing controller a global instance enabling the routing of messages to a routing set of other node devices, (b) creating at least one local instance for routing packets to a neighbor node device neighboring the node device, wherein step (b) includes selecting the neighbor node device regardless whether the neighbor node device belongs to the routing set of other node devices, (c) configuring the routing controller to use the local instances for routing of multicast messages.

As seen above, the local instance can be used to reach neighboring nodes that are not reachable with the global instance and that are part of another subnetwork. Then, the nodes of this other subnetwork can use their own global instance to route messages to nodes of their subnetwork. By routing the multicast messages with the local instance, this enables to route messages more efficiently. This is particularly adapted to the use of applications involving local communication where a plurality of neighboring node devices have to be informed of the detection of a moving person or vehicle, so that the neighboring devices can be switched on accordingly.

In accordance with an embodiment of this aspect of the invention, the configuration of local instances in step (c) used with a physical interface is done by means of a message exchanged over another physical interface.

In accordance with another embodiment of this aspect of the invention, the configuration of local instances in step (b) comprises assigning to the node device a local instance in which the node device acts as a root and assigning identifiers of other local instances in which the node device acts as a listener.

In accordance with an embodiment of the second aspect of the invention, step (a) further comprises creating at least one destination oriented directed acyclic graph defining the routes linking the node devices of the routing set and having as a root a node device being a router device bridging the network to a backend. Thus, depending on the application or the target nodes of the message and their respective position in the network, the node device is configured to use the global instance instead of the local instance for routing messages, offering more flexibility in the routing of messages.

In accordance with another embodiment of the second aspect, step (b) further comprises creating a destination oriented directed acyclic graph defining the route linking the neighbor device to the node device. Moreover, step (a) and step (b) are carried out based on respective geographical information of the node device and the other node devices. Thanks to the respective information of the node device, the local instance can be configured so that it creates a communication bridge or link between two isolated subnetworks formed by the global instance routing scheme. For example, the global instances and the local instances can select node devices to ensure that any different global instance is bridged by one or more local instances. This permits in some embodiments to avoid the routing of messages through the backend which would be inefficient. This could also be costly, since it may require for example GPRS resources which are charged to the service provider.

In a further variant of this embodiment, prior to steps (a)-(c), the method comprises the step of the node devices of the network transmitting their respective geographical information to a central controller in the backend, and steps (a)-(c) are carried out from said central controller. The node device may include for example a GPS chipset to establish their geographic information in an accurate manner and transmit these to the central controller in the backend. Geographical information might also be obtained by other means, e.g., from the cellular network. The central controller in the backend has more computation power than the node devices to create and configure in an optimized manner the routing schemes to be used by the network.

In a variant of the embodiments of the second aspect of the invention, steps (a)-(c) are carried out from a central controller in the backend. It may not be necessary for the node devices to transmit their geographical information since these may be known in advance for example from the installation map.

In a further variant the embodiments of the second aspect of the invention, step (b) comprises creating a MPL interface (where before we had a local RPL instance) for the MPL protocol, and the node device is the unique seed of the MPL protocol. In another variant of the embodiments of the second aspect of the invention, step (a) comprises creating a MPL interface in the global instance for the MPL protocol, and wherein a router node connected to the backend is the unique seed of the MPL protocol. The Multicast Protocol for Lossy and low-power networks (MPL) is a candidate for 6LoWPAN in view of its properties and its efficiency in such networks.

In still another variant of the embodiments of the second aspect of the invention, steps (a) and (b) comprise creating an RPL interface in the local instance and global instance for the RPL protocol.

In still another variant of the embodiments of the second aspect of the invention, the local instances are defined with a routing tree which is of the minimum depth. This means for example that all the nodes listed in the local instances can be reached in one hop (no intermediary retransmission required). This enables simplicity and efficiency in the routing of messages. Obtaining these trees of minimum depth is particularly simple if they are computing in the backend having global knowledge of the network and the exact geographical location of the devices.

In another variant of the embodiments of the second aspect of the invention, the local instance defines routes by means of a tree structure, having a root, intermediary nodes and leaves, and wherein messages routed from the root to the leaves in the local instance are multicast more than one time by the root and all the intermediate nodes to ensure reliability. By repeating the message which is multicast, this allows to maintain reliability in the transmission of messages.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to node devices in a network and to a method for configuring such node device to enable the routing of messages in the network.

Figure 1:
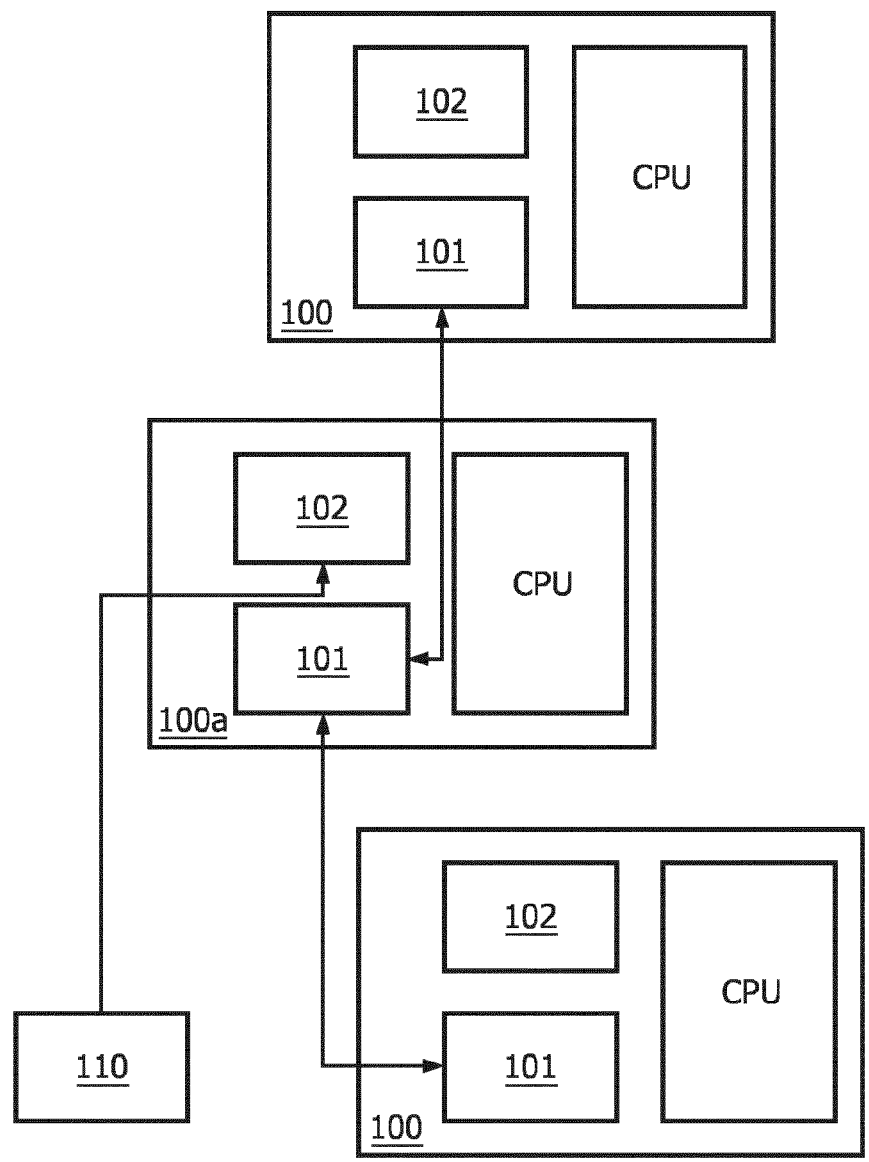
FIG. 1 is a block diagram of a network in which the invention can be implemented.

As seen earlier, there is a need for a multicast protocol in a network as depicted on FIG. 1. Indeed, in outdoor lighting networks, multicast can be used to switch on or off a group of luminaires or to inform a group of luminaires of a detected object in the vicinity of a node device.

Multicast Protocol for Low power and lossy networks (MPL) is a protocol that will be used for multicast in 6LoWPAN networks. The main features of MPL protocol are as follows:

Every node device has one or more MPL interfaces. These interfaces have one or more unicast IP addresses associated.

Each interface can subscribe to one or more MPL domains. There is one unique multicast address associated with each domain.

Among the nodes who have joined a domain through one of their interfaces, there are some special ones which emit information into the domain. These nodes are called seeds.

When a seed sends a message, it will use the domain multicast address as destination and every node subscribed to that domain will receive the message.

All nodes work as MPL forwarders. Thus, if a node has not previously received a message, it will retransmit it.

The trickle algorithm is used to control the multicast communication and retransmissions.

In an embodiment of the invention, RPL can be used to create routing entries. RPL fits well for a unicast communication pattern. On the other hand, MPL is a good option for multicast communication.

Figure 2:
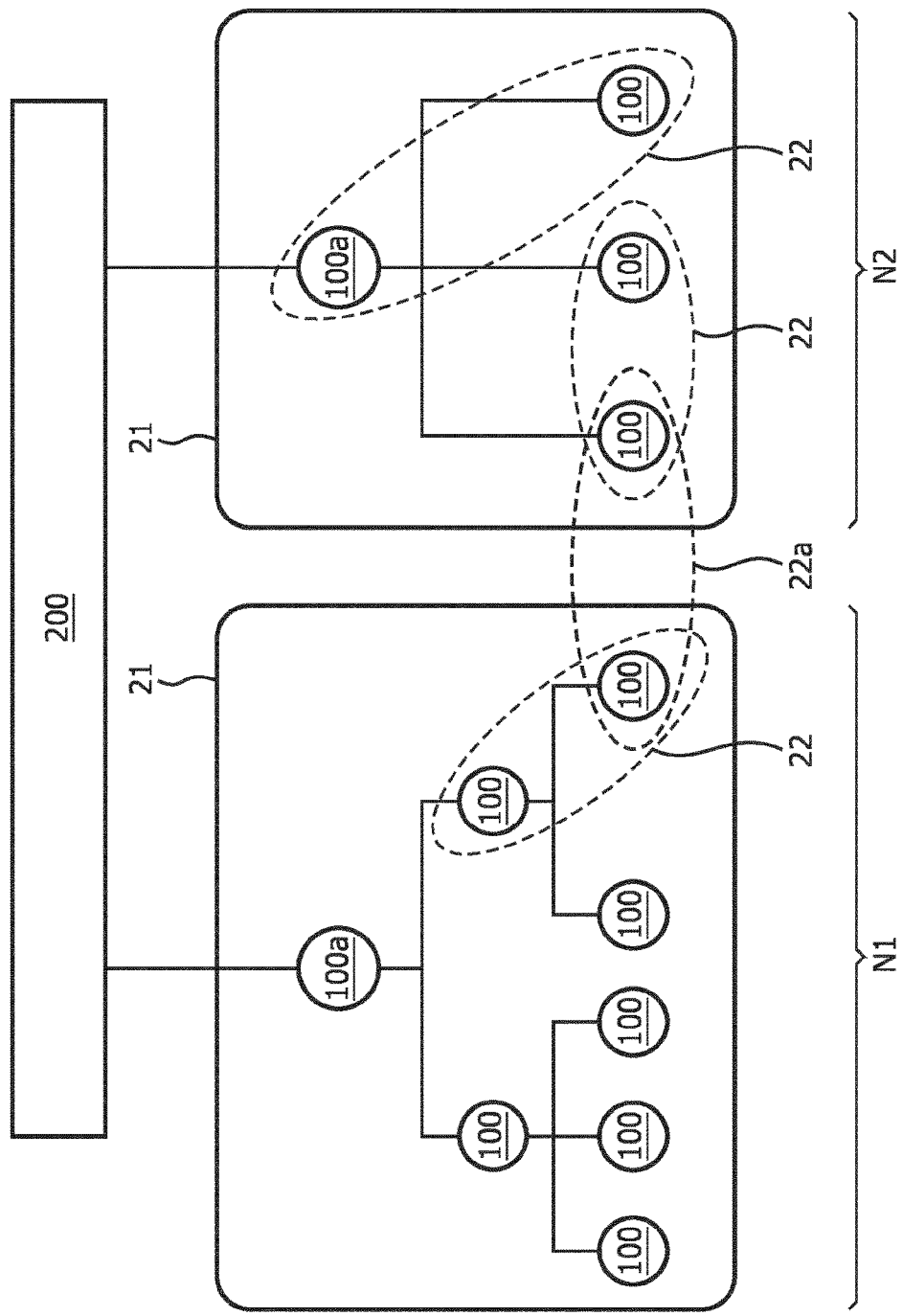
FIG. 2 is the representation of the routing instances in a network comprising nodes in accordance with an embodiment of the invention.

As shown on FIG. 2, a first embodiment of the invention makes use of global and local RPL instances for achieving all communication goals. In the network of FIG. 2, a plurality of node devices 100 and 100a are interconnected and form different subnetworks N1 and N2. The node devices 100 and 100a are connected to each other by means of their mesh interface. The node devices 100a however further operate as border routers using their GPRS interface to communicate with a backend network 200, connected to a remote controller (not shown).

For routing data packets over the networks N1 and N2, global and local RPL instances are distributed in the network. On FIG. 2 are represented the contents of some global instances with reference to the part of the network 21 and the connections between node devices as routes. Similarly, the reference 22 is used for representing some examples of local instances by means of which neighboring nodes can route messages to each other. For each subnetwork N1, N2:

There is one global instance 21, with several DODAGs in it. Each DODAG root will work as a border router 100a, having its GPRS interface enabled to communicate with the backend 200. Every node device 100 of the subnetwork will join one DODAG of this global instance.

Each node device 100 and 100a of the subnetwork will own at least one local instance 22 to which neighbouring nodes in close vicinity will join or will be added.

With this structure, all the communications patterns can be achieved:

Both the upwards/downwards unicast and the multicast communication between each node device and the backend will be accomplished using the global instance 21.

Node devices (that are sensors in this case) will use their local instance 22 to send multicast information to the neighbouring nodes which have joined it.

By selecting, in a node device local instance 22, other nodes regardless whether these other nodes are included in the global instance of the node device or in the global instance of another node device having a different root, links can be created between the different subnetworks N1 and N2 that would have been otherwise isolated. For example, the local instance 22a is bridging on the two subnetworks and enables communications from the network N1 to the network N2 without going through the backend. In a variant of the invention, it can be preferred to create local instances including nodes that are not already included in the global instance in order to increase the probability of creating multiple links with other subnetworks.

In accordance with a conventional approach, there would be no other way to link nodes from one sub-network to another but via the backend. This would create lags, and consume GPRS resources which are more expensive than direct link. This would not allow the implementation of some applications, e.g. light levels tracking and following a moving object from the first subnetwork N1 to the second subnetwork N2. As can be seen, the use of local instances to spread information to the closest nodes avoids the limitations of this conventional approach, where nodes from different subnetworks could not communicate. A complete explanation of all the possible scenarios is represented on FIGS. 3A to 3D. On these FIGS. 3A-3D, the global instance is shown in the upper part of the diagram with its tree-like structure. Several local instances are then shown, each dedicated to a considered node. For the sake of clarity, only the local instances of the eight node devices (1001-1008) at the bottom of the network are shown. However, intermediate node devices or border routers nodes also have local instances to route messages to their respective neighbours. For example, the local instance of node 1001 shows how the local instance of this node device 1001 routes messages to node devices 1002 and 1003.

Figure 3A:
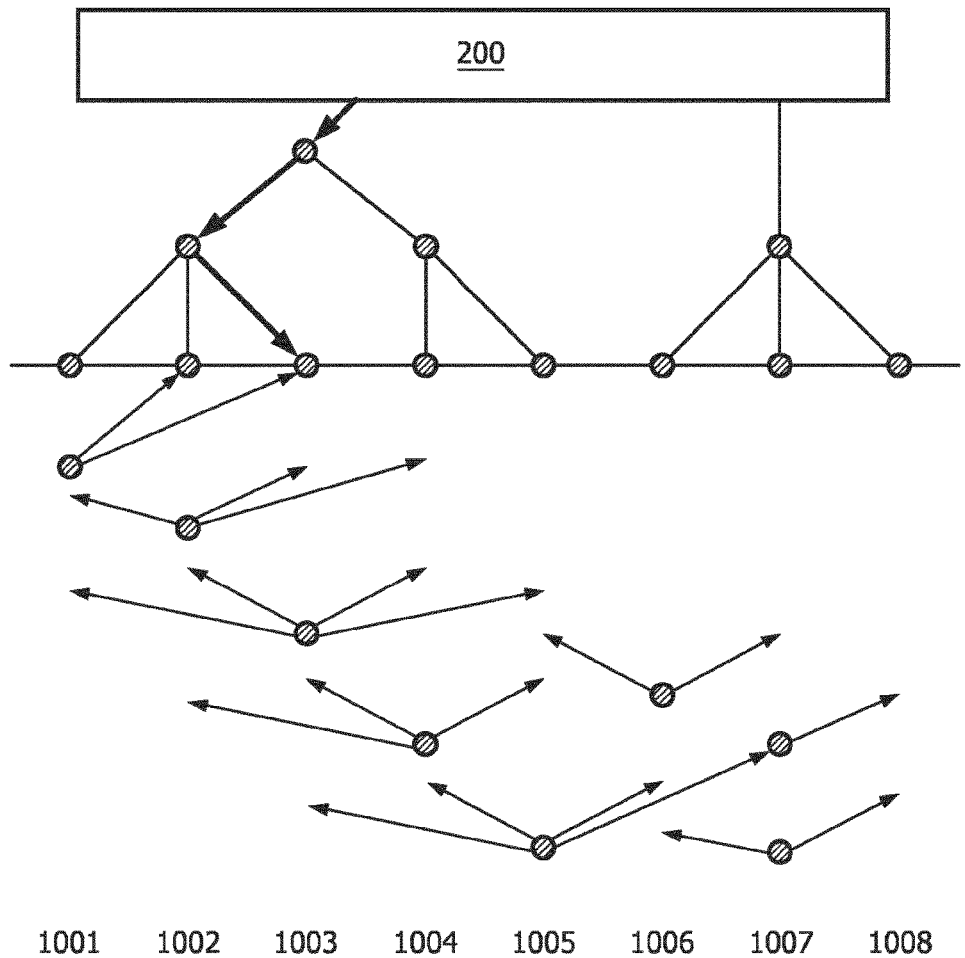
FIG. 3A-3D show the routing of packets in the network of FIG. 2.

FIG. 3A shows the routing of a unicast message from the router using the global instance. As can be seen by the bold arrows, a data packet is routed in a unicast manner from the backend 200 to the node device 1003. The global instance can be used to route any unicast message from the backend to any of the devices. This can be used for example by the remote controller to command a single luminaire to switch on or off.

Figure 3B:
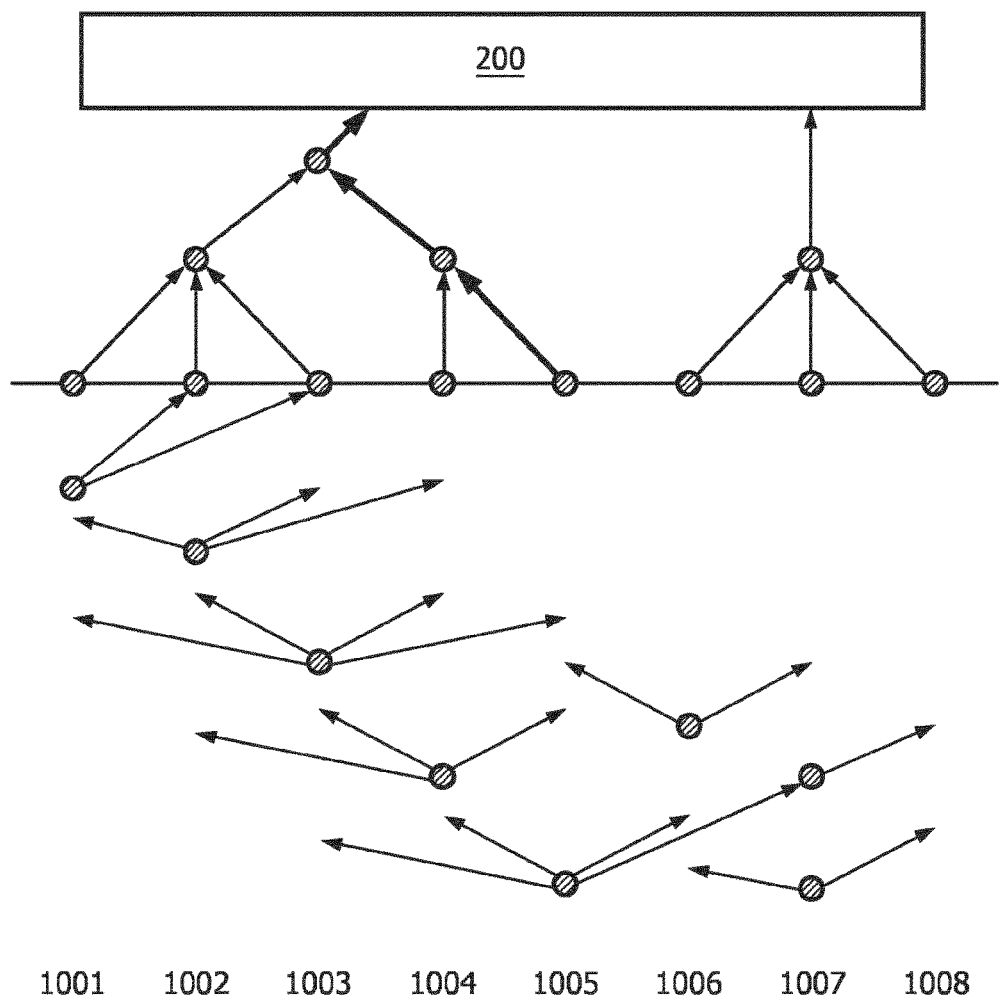

The opposite route is illustrated by FIG. 3B which shows the routing of a unicast message from node 1005 towards the router node and then the backend using the global instance. This can be used for the node devices to route messages that feedback for example some information on a state of the luminaire or the amount of energy consumed by the luminaire.

Figure 3C:
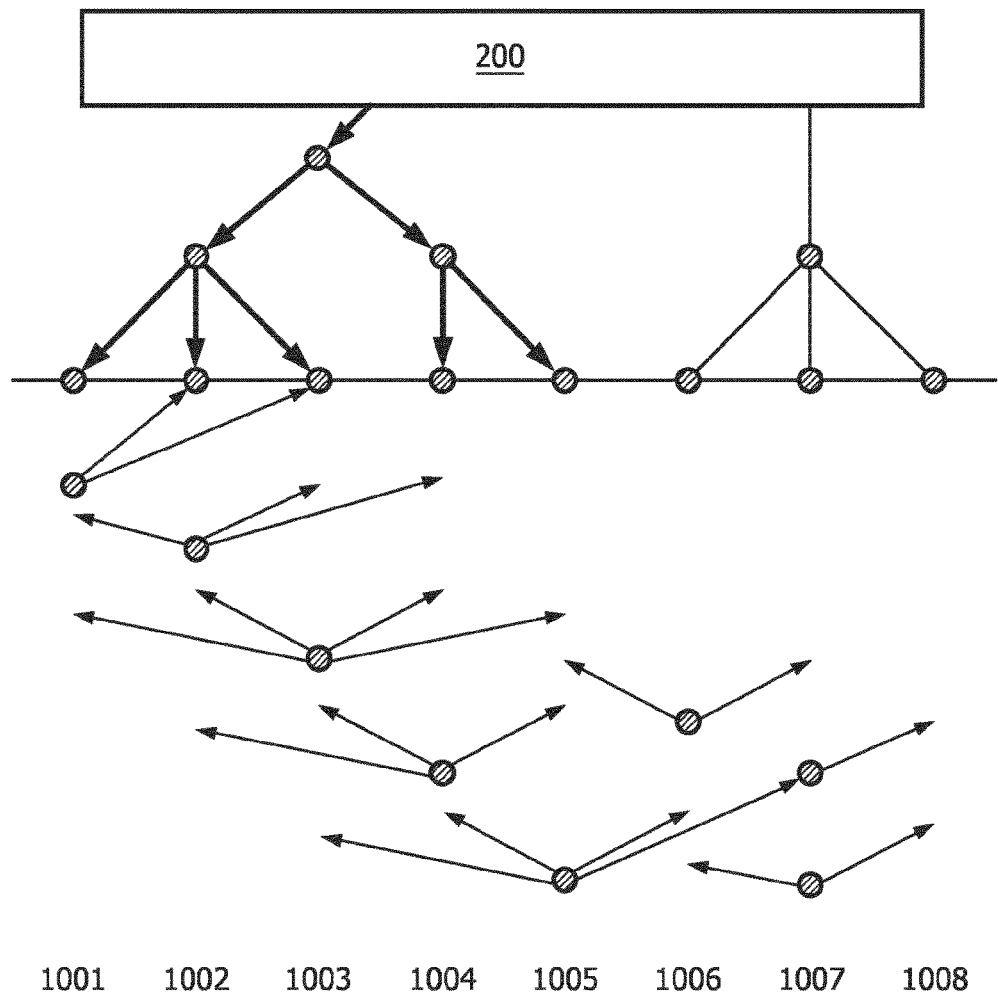

FIG. 3C shows the routing of a multicast message from the backend to a group of luminaires. This can be used for spreading configuration parameters to a group of luminaires or for example to switch on or off a group of luminaires.

Figure 3D:
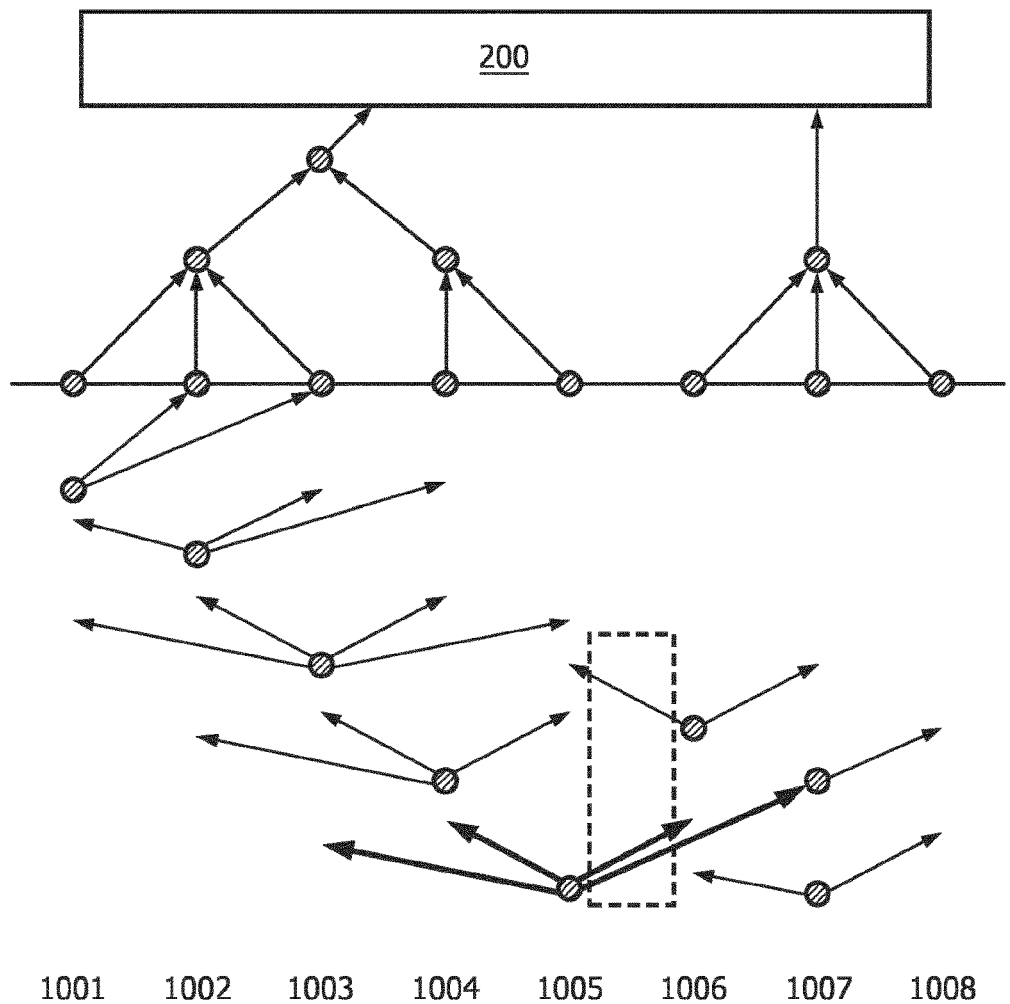

In case of multicast from the nodes, or for some local communications like unicast to a neighbour node, the routing is shown by FIG. 3D. In this case, the local instance is used to route messages. On the example of FIG. 3D, the node 1005 can reach by multicast the neighboring nodes 1003, 1004, 1006 and 1007. The nodes 1006 and 1007 are reached by the node device 1005 although not in the same network. For example, in case of the broadcast of a message using the Trickle algorithm, the messages can navigate and reach the other subnetworks faster, and does not require to go through the backend 200.

As shown on FIGS. 3A-3D, the local instances are defined with a routing tree which is of the minimum depth. This means that from the node device serving as the root, all the other nodes can be reached in the minimum number of hops. Typically, the minimum number of hops is 1, i.e. the root node can reach directly all the nodes listed in the local instance.

The inclusion of local instances has more advantages than avoiding global structures limitations. Each node can own several local instances, which could result in a versatile response depending on the situation. If the instances are created following different application requirements, the network could react to an event at the routing level in function of its application needs (cross-layer optimization).

For example, if we have a few instances based on the distance or number of hops we want a message to travel and that something in the environment is detected, the network will be able to spread the message to few hops (e.g. detection of a slow moving object like a person) or it can be decided to send it as far as possible (e.g. detection of fast moving object like a car). Also, in the car scenario, it is possible to spread the messages only in the direction the car is going.

The creation of the instances and optionally of the associated DODAG can be done in the backend. To achieve this, the backend will run algorithms based on metrics such as position, line of sight, distance between nodes and signal strength.

Some of this metrics will be sent from the nodes to the backend via GPRS during or after the commissioning phase. The remaining metrics will be calculated by the backend with geographical information (geographic position of the nodes). As in some lighting networks, all node devices have a GPS module, the position of each node device could be sent, for example through GPRS during the commissioning, with the metrics mentioned before.

Then, the backend starts the algorithms, for example based on the received geographic information and creates a set of network parameters for each node. Finally the Backend will push the network parameters to each node through GPRS.

The creation of the local instances is facilitated by the global information of the network. As said before, global information can be computed with the position of the GPS, or in a variant based on location information stored during the installation of the network.

For the creation of each local instance, the following algorithm can be executed at the backend. This algorithm has as input the set of nodes which are to join the local instance and includes several functions. This algorithm generates the structure with minimum number of hops. This is achieved by adding one hop more in every iteration only if the links are valid. The validation of the link can be varied or adjusted for example based on the situation (environment, proximity of interference sources) and on the required performance of the network. For each node the algorithm will add the best link for it (which will be a node of the previous iteration).

---

Input:
There are two principal inputs for this algorithm:
Node which will become the root of our hierarchical structure.
Set of nodes we want to include in the topology we are creating.
The determination of this set of nodes is not defined by this algorithm.
Also, we need metrics information to decide whether a link is suitable for the communication or if it does not have enough quality to be used.
Output:
List of nodes with associated parent into the instance.
Nodes which could not join the structure. This can happen if there is no link which fulfills the communication requirements.

---

The computation of the set of nodes could be different depending on the application (e.g: a car going in one specific direction or a person walking will not need the same scope, as explained in feature 1) or all the nodes in a given area cantered in a given location. So, each node could have more than one local instance for each application purpose.

This algorithm can be run in the backend, as mentioned previously. In that feature, the main metrics are mentioned too. This metrics will be used in a cost function, which will be called in the next functions:

valid_link(node1, node2):
Checks if the link between two nodes is good enough to be used
Input: node1 and node2 which form the link to be verified
Output: True if the link between node1 and node2 is suitable. False otherwise.
best_link(node, parent1, parent2):
Given two possibilities, returns the best parent for a node.
Input:
- node : Node we are looking a parent for.
- parent1 : First option.
- parent2 : Second option.
Output: Best parent between the two available.
look_for_parent(node, list):
Searchs for the best parent for a node inside the list of available parents at the moment
Input:
- node : Node we are looking a parent for.
- list : Available nodes to become parent of that node.

Output: Best parent available or null if there is not a valid one within the list.
look_for_parents(included, look_for):
Searchs for the best parent for a set of nodes inside a list of possible parents
Input:
- included : List of nodes which are already in the structure.
- look_for : Nodes that still need a parent.
Output:
- added_nodes: list of nodes which have received a parent in this function call.
- remaining: Nodes that have not received a parent in this function call All the above abstract functions are detailed in the following compact algorithm.

First of all, we need to declare two special functions which are used within the algorithm. These are based in a cost function to accomplish their objectives:
valid_link(node1, node2):
Checks if the link between two nodes is good enough to be used
Input: The two nodes involved
Output: True if the link between nodes is suitable. False otherwise.
best_link(node, parent1, parent2):
Given two possibilities, returns the best parent for a node
Input:
• node : Node we are looking a parent for.
• parent1 : First option.
• parent2 : Second option.
Output: Best parent between the two available.
With the functionality defined above, we can show now the functions used by this algorithm in order to establish the local instance structure, and finally the algorithm code.
look_for_parent(node, list):
Searchs for the best parent for a node inside the list of available parents at the moment.
Input:
• node : Node we are looking a parent for.
• list : Available nodes to become parent of that node.
Output:
• Best parent available or null if there is not a valid one within the list.
1: temporal_parent null
2: for all n in list do
3: if valid_link(node, n) then
4: if temporal_parent is null then
5: temporal_parent n
6: else
7: temporal_parent best_link(node, temporal_parent, n)
8: end if
9: end if
10: end for
11: return temporal_parent
look_for_parents(included, look_for):
Searches for the best parent for a set of nodes inside a list of possible parents
Input:
• included : List of nodes which are already in the structure.
• look_for : Nodes that still need a parent.
Output:
• added_nodes: list of nodes which have received a parent in this function call.
• remaining: Nodes that have not received a parent in this function call
1: aux null
2: for all n in look_for do
3: aux look_for_parent(n, included)
4: if aux is null then
5: add n to remaining
6: else
7: add n to added_nodes
8: set aux as parent of n
9: end if
10: end for
11: return {added_nodes, remaining}
Algorithm:
Generates the structure with minimum number of hops
Input:
• root: Node which will become the root of the local instance.
• nodes: List of nodes we want to join the instance.
• Metrics used to establish link cost: distance, line of sight(LoS), signal strength.

```
Output:
• List of nodes with associated parent to form the instance.
• Nodes which could not join the instance.
1: last_included {root}
2: not_included nodes
3: while last_included is not null and not_included is not null do
4: {new, remaining} look_for_parents(last_included, not_included)
5: {last_included, not_included} {new, remaining}
6: end while
The while loop in the algorithm has two possible endings:
• last_included is not null and no_included is null: Normal ending, all nodes have joined the
local instance.
• last_included is null and no_included is not null: Some nodes could not join the instance
because they did not have any suitable link.
• Other combinations are not possible(notnull-notnull means continue in the loop and we
cannot have null-null because we must have ended in the previous iteration).
```

The RPL local instances provide a good solution for enabling all the communication use cases. A consideration is whether RPL can be improved by adding features of MPL. We can apply this protocol in both global and local instances with this structure. In local instances:

Each node will have a MPL interface.
Also, each node will be subscribed to a MPL domain where it is the unique seed.
The other nearby nodes will be subscribed to that domain as MPL forwarders.

In global instances:

Again, every node will have a MPL interface (the same one as for local inst).
We have a MPL domain for each DODAG, with the root as the only seed in it.
Every node in the DODAG will be subscribed to the DODAG domain.

Apart from the solution explained above, we can think in another approach. Use a global MPL domain for the whole network, which will be used for local and global multicast messages. To achieve this, we need to establish a maximum number of hops into each message:

If we want a message to be distributed globally, we can set this number of hops as the maximum admissible.
If we want a message to have a local range, we can limit the number of hops, to avoid the spreading of the message in the whole network.

In the two approaches discussed, we still need to have the RPL global instance to fulfil the unicast communication between the backend and the network nodes.

Figure 4:
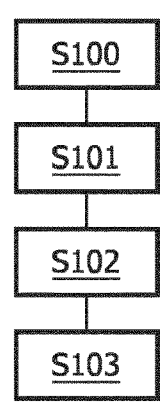
FIG. 4 is a flowchart representing a method for configuring the network in accordance with another embodiment of the invention.

In accordance with another aspect of the invention depicted on FIG. 4, a method for configuring a network is illustrated in the flowchart. In the network of FIG. 2, the method comprises the steps of

S100 the node devices of the network transmit their respective geographical information to a central controller in the backend. The geographical information, which could also be obtained from a data storage in a variant of this embodiment, is used to optimize the global instances and the local instances in view of the nodes locations.

S101 creating in the routing controller a global instance enabling the routing of messages to a routing set of other node devices.

S102 creating at least one local instance for routing packets to a neighbor node device neighboring the node device. Step S102 includes selecting the neighbor node device regardless whether the neighbor node device belongs to the routing set of other node devices. Thus, the local instances can be configured to bridge over two networks formed by the global instances.

S103 configuring the routing controller to use the local instances for routing of multicast messages. In particular, Step S103 comprises assigning to the node device a local instance in which the node device acts as a root and assigning identifiers of other local instances in which the node device acts as a listener. Thus, each node knows all the local instances it takes part, either as the root or as a destination.

The steps S101-103 may be carried out from the remote controller in the backend. Indeed, this entity has usually more processing power can thus optimize the configuration of the local instances and the global instances.

In an additional embodiment, a node device (i.e. device comprising a routing controller) uses a non-standardized application-layer solution (e.g. a proprietary solution) for the routing of at least some of the packets in a local instance. With non-standardized, it is meant that the operation of the local instance does not necessarily follow the RPL specifications. However, in this embodiment the routing in the global instance is still performed as described in the other embodiments.

In this embodiment, the operation of this single local instance is as follows. A sensor node generates an event that needs to be delivered to a destination group of nodes. The sensor transmits a packet containing event information using single-hop multicast or broadcast, named here event message. For example, it could be a link-local IPv6 multicast UDP message.

The event can be for example the detection of a moving person or a moving vehicle by a motion detector, a light level detected by a light sensor. The event information includes an identifier of which destination group the event needs to be communicated to. For example, the group could be specified as an IPv6 multicast destination address in an IPv6 UDP packet. Or it could be included in the payload of a UDP message. All or most direct (one-hop) neighbors of the sensor node will receive this transmission. Any nodes that are not configured to receive such transmissions, e.g. because they do not recognize the format or because destination address(es) do not match the group membership of the node, will simply discard the packet.

Any nodes that are configured to react to the event message will perform at least one of below tasks, depending on their configuration which one(s):

1. Pass the event information on to an application running locally on the node and use it to switch on, off, or change dim level of the local light source(s) controlled by the node.

This happens if at least one local light source is configured to be part of the group that is indicated in the event message.

2. Re-broadcast (or multicast) the event message to its neighbor nodes. Before re-broadcasting, the event message may be modified in various ways.

a. Optionally, a "Hop Limit" counter that is kept in the event message is decreased before sending or alternatively a "Hop Count" counter is increased before sending. In this case a sending node also checks based on the counter if the message can still be re-broadcasted based on configured maximum hops limits. Such function helps to limit the number of nodes over which an event message is spread by this method, to prevent network congestion.

b. Optionally, a node waits a random time period before attempting re-transmission to help prevent congesting the wireless network.

c. Optionally, a node is configured to repeat the re-transmission a number of times, e.g. 3 times with random waiting intervals, or multiple times with varying waiting intervals as scheduled by a Trickle algorithm. This is used to increase reliability of the method in case RF packets are lost.

d. Optionally, before re-transmission a check is done whether the specific event message has already been transmitted before by the node or not. If transmitted before N times, the node decides not to re-transmit again. The value N is configurable here (e.g. N=1, or N=3). This can be used to help prevent congesting the wireless network.

i. The check for new-ness could be performed using known means e.g. a combination of original sender identity (i.e. the sensor node) and a sequence number in the event message (assigned by the sensor node).

e. Optionally, a node completely reconstructs the event message based on the previous received event message. (This is e.g. useful if a different encryption has to be applied to the packet.)

The above tasks may be running fully or mostly at application level, i.e. the re-broadcasting function described is not necessarily integrated into a communications stack on the local node but can run as an application on top of the stack. For example, using the API/facility of link-local UDP IPv6 multicast offered by a 6LoWPAN stack.

Another alternative embodiment is equal to the above embodiment except that only "group members" (i.e. node devices in the destination group that the sensor node sends to) are configured to re-broadcast event messages. This slightly simplifies the configuration effort that is needed for the system. However, this means that for a specific type of message, the local instance of the routing entity used for routing this type of message is based on the group members, i.e. the neighboring node devices in the set of nodes listed in the global instance to which the node device belongs to.

In a further embodiment, a node (i.e. device comprising a routing controller) has to perform the routing of packets in a local instance using a Frequency Hopping (FH) based method for wireless communication. The use of FH is preferred or even mandated for some regions of the world, but it provides additional challenges for the routing within local instances.

In this embodiment the routing in the global instance is performed in the way as described in other embodiments of this patent application. Also the local instance routing operations can be performed in the same way, thanks to the provisions of described in the embodiments below to keep multiple global instances synchronized in time with each other.

In a Frequency Hopping type of system, the RF frequency channel changes ('hops') based on an internal timer in each node. The channel changes follow a known pseudo-random pattern called the hopping sequence, or channel sequence. The pattern can be the same for all nodes or different per node. In any case, the pattern (or multiple patterns) is known to all nodes in a system. To make sure that nodes can communicate i.e. a node knows what channel its neighboring nodes are operating on, time synchronization of the internal node timers is needed. To accomplish the time synchronization, there is usually a single node that acts as coordinator/Time Source and sends out time beacons that other nodes listen to sync their timer. Nodes that are out of reach of the Time Source node will time sync by receiving the time beacons of other nodes which send out time beacons based on their internal clock (but only if this clock has been synced already to time beacons of others). In this manner, a time beacon originating at the Time Source will "spread" throughout a mesh network covering all the nodes of the global instance.

Then, from the internal timer typically at least two variables are computed:

1. Channel Index—points to the current position in the channel sequence

2. Dwell timer—indicates how much time has already been spent operating on the current channel.

Figure 5:
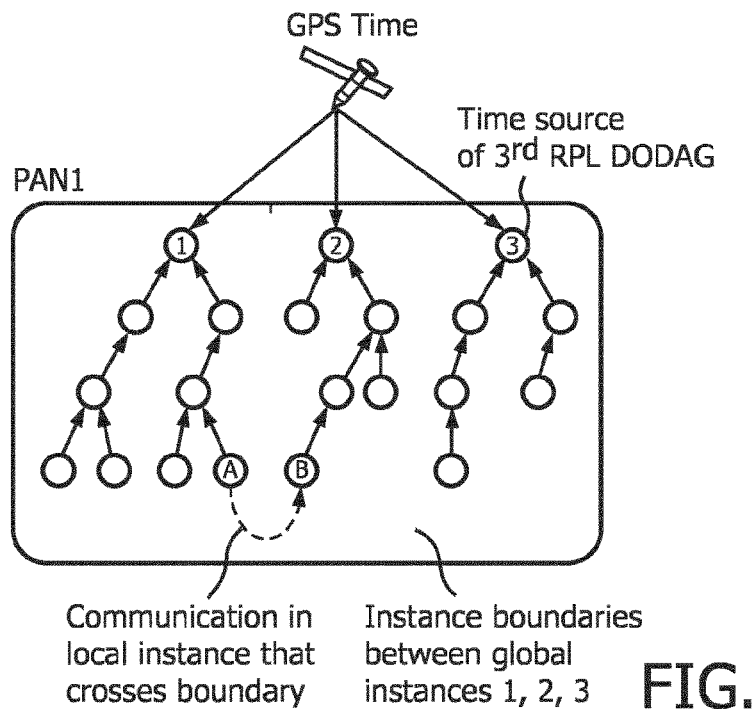
FIG. 5 is the representation of the routing instances in a network comprising nodes in accordance with another embodiment of the invention.

In the embodiment represented on FIG. 5, the nodes 1, 2, 3 are each a Time Source for a single global instance. The time beacons will spread to all nodes eventually through 1, 2 or 3 hops in the mesh. For example, the nodes A and B are both time-synchronized by the time beacons of their respective parent nodes as indicated by the arrow.

However, normally in a Frequency Hopping system, the Time Sources independently operate their internal timer without being synchronized to other clocks. There is also no need to have the internal timer synchronized to any other, because the time reference is only used within the boundaries of a single mesh network (global instance). In the situation of the embodiments of the invention, where local instance communication is needed, possibly across the boundaries of global instances, synchronization is required.

For example, the nodes A and B in FIG. 5 need to communicate with neighbor nodes within their local instance, as represented by the dashed communication lines. This communication would not be possible if the nodes A and B are operating on different channels due to the Frequency Hopping. In a normal Frequency Hopping system, the internal timers of node 1 and 2 would not be synchronized hence nodes A and B most likely would operate on two different channels. Indeed, A derives its time reference—indirectly—from Node 1 and B indirectly—from Node 2.

The solution given by the embodiment of FIG. 5 is based on a GPS time Sync. FIG. 5 shows a conceptual sketch of the solution to keep multiple global instances synchronized in time using a GPS/GNSS absolute time reference.

In accordance with this embodiment, for at least two global instances, each node is configured with a deterministic pseudo-random sequence, or function to calculate such sequences. Each value in the sequence designates a frequency channel to operate in. Each node (e.g. 1,2,3) that is configured as a Time Source within a global instance enables its GPS receiver, from which an absolute time reference is obtained (such as GPS Time or UTC). It is to be noted that also other GNSS/satellite navigation systems may be used along with or instead of GPS: Glonass, Galileo, Compass. In this example, the border routers are preferably configured as Time Sources but in another variant, the Time Source could be included in another (or a plurality of) node(s) of the global instance.

From the Reference Time, the following two variables are calculated
 a. Channel Index pointing to a channel in the pseudo-random channel sequence.
 b. Dwell timer value, used to set an initial value for the Dwell timer.

The above variables are used to construct the time beacon signals; and other nodes per global instance synchronize to these time beacons as usual in FH systems.

The effect of above solution is that nodes A and B are, at any time, able to communicate with each other on the same channel. This allows nodes to route packets over a local instance in the same way as described earlier in this patent application.

The accuracy of GPS Time that can be obtained in a low-cost node (in the order of microseconds) is sufficient to achieve the required accuracy (which is in the order of 0.5-100 ms, depending on the wanted performance of local instance communication and FH parameters used).

In a variant of the embodiment of FIG. 5, time pulse signal can be used. In this advantageous example, the GPS module can be configured to generate a timing pulse on a wire, which is sampled on an input pin on the radio chip. The radio chip can accurately calculate the two variables mentioned earlier (Channel Index and Dwell Timer) by using the following data in combination:
 1. Timing pulse transitions
 2. Reference Time (e.g. UTC) based Timestamp obtained from the GPS module via its serial API Here, the Timestamp information provides the absolute time with some uncertainty (e.g. jitter due to serial communication or processing delays), which the time pulse transitions provide the information to correct for the inaccuracy.

Note that the time pulse signal will still be generated by the GPS module based on local clock if the GPS signal is temporarily lost. In this case the internal timer of the Time Source node will slowly drift away from the wanted Reference Time. Depending on crystal accuracy and ambient temperature changes, the timer in the Time Source node can remain good enough for our purposes for several minutes up to many hours.

Figure 6:
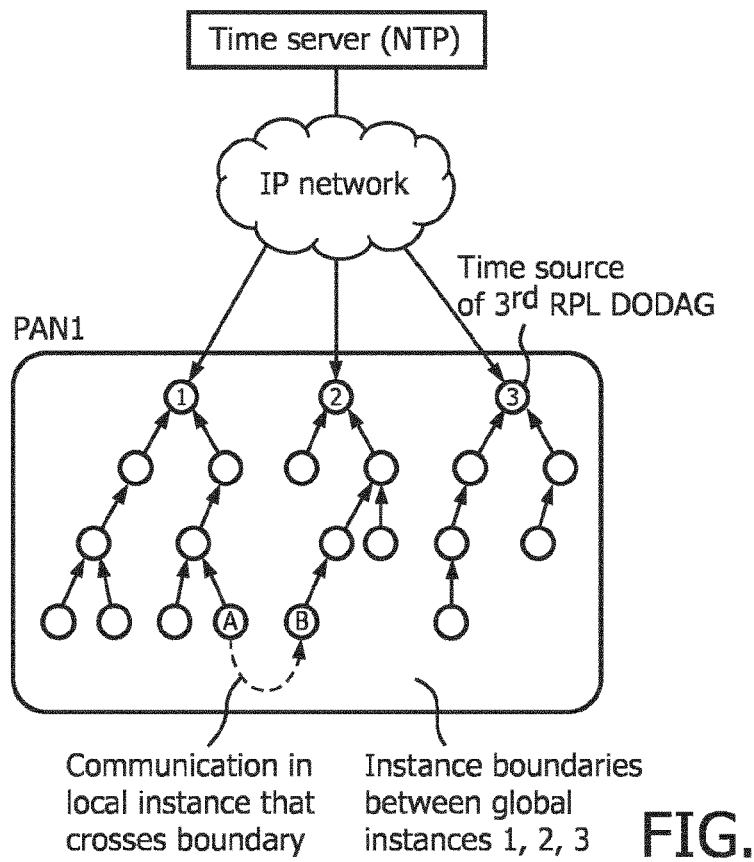
FIG. 6 is the representation of the routing instances in a network comprising nodes in accordance with still another embodiment of the invention.

In another embodiment disclosed on FIG. 6, Network Time Protocol is used.

This embodiment is similar to the embodiment of FIG. 5, except that the Network Time Protocol (NTP) is used to derive the Reference Time instead of GPS. This embodiment can be applied as a backup solution in case GPS signal is temporarily unavailable (e.g. due to weather conditions or blockage), or as a stand-alone solution (instead of GPS).

As shown on FIG. 6, each Time Source regularly contacts a Time Server and runs a protocol (such as NTP) to synchronize its local timer with the Reference Time of the Time Server.

If the back-end network communication is over low-latency high-datarate technologies such as Ethernet or WiFi, a time accuracy of 1-10 ms can be achieved, which is sufficient although communication performance is inferior to the GPS based method if the accuracy becomes larger than ~1 ms. Over cellular (2G/GPRS, 3G, 4G) technologies the performance is expected to be worse. For 3G cellular, one test shows that 10 ms accuracy can be achieved most of the time and 20 ms all of the time.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

The invention claimed is:

1. A device comprising a routing controller for routing messages to a plurality of node devices of a network, the routing controller comprising:
 a communication interface to route messages to other node devices of the plurality of node devices;
 a processor to process at least one global instance enabling the routing of messages to a routing set of node devices, at least one local instance for routing packets to a neighbor node device neighboring the device, wherein the neighbor node device is selected regardless whether the neighbor node device belongs to the routing set of node devices, and wherein the routing controller is configured to use the local instance for routing of multicast messages to the node devices.

2. The device of the claim 1, wherein the global instance comprises at least one destination oriented directed acyclic graph defining the routes linking the node devices of the routing set and having as a root a node device being a router device bridging the network to a backend.

3. The device of claim 1, wherein the processor is configured to use the global instance for unicast of messages and for multicast messages from the backend.

4. The device of claim 1, wherein communication between a backend and the network is carried out over a transmission medium which is different from the transmission medium of the network.

5. The device of claim 1, wherein the processor further processes a local instance for routing packets including a message of a predetermined type to an event neighbor node device, wherein the event neighbor node device is selected exclusively from the routing set of node devices.

6. The device of claim 5, wherein the predetermined type includes an event message including the signaling of detection from a sensor.

7. A method for configuring a node device in a network, said node device comprising a routing controller for routing messages to other node devices of a network, the method comprising the steps of
 (a) creating in the routing controller a global instance enabling the routing of messages to a routing set of other node devices,
 (b) creating at least one local instance for routing packets to a neighbor node device neighboring the node device, wherein step (b) includes selecting the neighbor node device regardless whether the neighbor node device belongs to the routing set of other node devices,
 (c) configuring the routing controller to use the local instances for routing of multicast messages.

8. The method of claim 7, wherein the configuration of local instances in step (b) comprises assigning to the node device a local instance in which the node device acts as a root and assigning identifiers of other local instances in which the node device acts as a listener.

9. The method of claim 7, wherein step (a) further comprises creating at least one destination oriented directed acyclic graph defining the routes linking the node devices of the routing set and having as a root a node device being a router device bridging the network to a backend.

10. The method of claim 7, wherein step (b) further comprises creating a destination oriented directed acyclic graph defining the route linking the neighbor device to the node device.

11. The method of claim 7, wherein step (a) and step (b) are carried out based on respective geographical information of the node device and the other node devices.

12. The method of claim 11, further comprising prior to steps (a)-(c), the step of the node devices of the network transmitting their respective geographical information to a central controller in the backend, and wherein steps (a)-(c) are carried out from said central controller.

13. The method of claim 7, wherein step (b) comprises creating a MPL interface in the local instance for the MPL protocol, wherein the node device is the unique seed of the MPL protocol.

14. The method of claim 7, wherein step (a) comprises creating a MPL interface in the global instance for the MPL protocol, wherein a router node connected to the backend is the unique seed of the MPL protocol.

15. The method of claim 7, wherein steps (a) and (b) comprise creating an RPL interface in the local instance and global instance for the RPL protocol.

16. The method of claim 7, wherein the local instances are defined with a routing tree which is of the minimum depth.

17. The method of claim 7, wherein the local instance defines the routes by means of a tree structure, having a root, intermediary nodes and leaves, and wherein messages routed from the root to the leaves in the local instance are multicast more than one time by the root and all the intermediate nodes to ensure reliability.

18. The method of claim 7, wherein step (b) comprises creating a further local instance for routing packets including a message of a predetermined type to an event neighbor node device, wherein the event neighbor node device is selected exclusively from the routing set of node devices.

19. The method of claim 18, wherein the predetermined type includes an event message including the signaling of detection from a sensor.

20. The method of claim 7, wherein the node device is operating in accordance with a Frequency Hopping communication mode, and wherein a time reference is obtained from a GPS or a Network Time Protocol.

21. The method of claim 20, wherein the time reference is spread in the global instance from its root.

* * * * *